United States Patent
Chou et al.

(10) Patent No.: US 10,252,371 B2
(45) Date of Patent: Apr. 9, 2019

(54) DIFFUSION-BONDED METALLIC MATERIALS

(71) Applicant: THE BOEING COMPANY, Chicago, IL (US)

(72) Inventors: Kathleen Chou, St. Louis, MO (US); Kevin Thomas Slattery, Saint Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/600,617

(22) Filed: May 19, 2017

(65) Prior Publication Data

US 2017/0361396 A1    Dec. 21, 2017

Related U.S. Application Data

(63) Continuation-in-part of application No. 15/043,231, filed on Feb. 12, 2016, now Pat. No. 9,682,445.

(51) Int. Cl.
*B23K 20/00* (2006.01)
*B23K 20/233* (2006.01)
(Continued)

(52) U.S. Cl.
CPC ........ *B23K 20/2333* (2013.01); *B23K 20/002* (2013.01); *B23K 20/02* (2013.01);
(Continued)

(58) Field of Classification Search
CPC .............. B23K 20/2333; B23K 20/026; B23K 20/002; B23K 20/16; B23K 20/10; B23K 35/025; B23K 35/001; B23K 20/02; B23K 31/02; B23K 35/34; B23K 2103/08; B23K 2101/18; B23K 2101/34; B23K 2103/15; B23K 2103/10
See application file for complete search history.

(56) References Cited

U.S. PATENT DOCUMENTS 3,369,288 A * 2/1968 Halnan ................. B21D 47/00
                                                            228/157
3,419,388 A * 12/1968 Arutunian ................ B22F 7/04
                                                            419/46
(Continued)

FOREIGN PATENT DOCUMENTS

DE       3239680 A1 * 11/1981
EP       0574115 A2    12/1993
(Continued)

OTHER PUBLICATIONS

Translation of SU-435648A1 (no date available).*
(Continued)

*Primary Examiner* — Kiley S Stoner
(74) *Attorney, Agent, or Firm* — Toler Law Group, P.C.

(57) ABSTRACT

A method includes disposing a hydride of a transition metal on a first metallic material, where at least one of the first metallic material or a second metallic material includes a surface oxide layer. The method includes performing a diffusion bonding operation to bond the first metallic material to the second metallic material. During the diffusion bonding operation, the hydride of the transition metal chemically reacts with the surface oxide layer.

18 Claims, 4 Drawing Sheets

(51) Int. Cl.
*B23K 20/02* (2006.01)
*B23K 31/02* (2006.01)
*B23K 35/34* (2006.01)
*B23K 20/10* (2006.01)
*B23K 20/16* (2006.01)
*B23K 35/00* (2006.01)
*B23K 35/02* (2006.01)
*B23K 101/34* (2006.01)
*B23K 103/10* (2006.01)
*B23K 103/08* (2006.01)
*B23K 101/18* (2006.01)

(52) U.S. Cl.
CPC ............ *B23K 20/026* (2013.01); *B23K 20/10* (2013.01); *B23K 20/16* (2013.01); *B23K 31/02* (2013.01); *B23K 35/001* (2013.01); *B23K 35/025* (2013.01); *B23K 35/34* (2013.01); *B23K 2101/18* (2018.08); *B23K 2101/34* (2018.08); *B23K 2103/08* (2018.08); *B23K 2103/10* (2018.08); *B23K 2103/15* (2018.08)

(56) References Cited

U.S. PATENT DOCUMENTS

| | | | | |
|---|---|---|---|---|
| 3,517,432 | A * | 6/1970 | Sandstrom | C04B 37/005 228/121 |
| 4,483,478 | A * | 11/1984 | Schulz | B21D 26/055 228/157 |
| 4,517,069 | A * | 5/1985 | Harney | B22F 3/1121 204/284 |
| H000340 | H * | 10/1987 | MacKenzie | 228/44.3 |
| 4,710,235 | A | 12/1987 | Scruggs | |
| 4,732,312 | A * | 3/1988 | Kennedy | B23K 20/24 148/535 |
| 4,830,265 | A * | 5/1989 | Kennedy | B23K 20/24 148/512 |
| 4,890,784 | A | 1/1990 | Bampton | |
| 4,905,886 | A * | 3/1990 | Kennedy | B23K 20/16 228/194 |
| 4,948,457 | A | 8/1990 | Cooper et al. | |
| 4,969,593 | A * | 11/1990 | Kennedy | B23K 20/24 148/535 |
| 4,982,893 | A * | 1/1991 | Ruckle | B23K 20/22 148/527 |
| 5,224,645 | A | 7/1993 | Cooper et al. | |
| 5,863,398 | A * | 1/1999 | Kardokus | B22F 7/08 204/298.13 |
| 6,555,778 | B1 * | 4/2003 | Barnett | B23K 10/006 156/272.2 |
| 2002/0023611 | A1 * | 2/2002 | Hara | B22D 17/24 123/19 C |
| 2004/0065546 | A1 * | 4/2004 | Michaluk | C22B 7/002 204/298.12 |
| 2004/0262367 | A1 | 12/2004 | Nakamura | |
| 2005/0244266 | A1 * | 11/2005 | Imbourg | B22F 3/15 415/182.1 |
| 2006/0219756 | A1 | 10/2006 | Tada et al. | |
| 2010/0036388 | A1 * | 2/2010 | Gomez | A61F 9/00745 606/107 |
| 2013/0236738 | A1 | 9/2013 | Yamauchi et al. | |
| 2014/0126155 | A1 | 5/2014 | Imamura et al. | |
| 2014/0335368 | A1 * | 11/2014 | Faruque | B62D 29/008 428/594 |
| 2015/0208496 | A1 | 7/2015 | Terasaki et al. | |
| 2015/0313011 | A1 | 10/2015 | Terasaki et al. | |
| 2016/0185081 | A1 * | 6/2016 | Sandlin | B32B 17/061 428/336 |
| 2018/0005720 | A1 * | 1/2018 | Cabauy | A61N 1/378 |

FOREIGN PATENT DOCUMENTS

| | | |
|---|---|---|
| EP | 0574115 A2 | 1/2000 |
| EP | 2774699 A1 | 9/2014 |
| GB | 980622 | 1/1965 |
| SU | 435648 A1 * | 9/1976 |

OTHER PUBLICATIONS

Russian Office Action for Application No. 2016145134 dated Mar. 13, 2018, 6 pgs.

Extended European Search Report dated Jul. 31, 2017 for Application No. 17153027.2, 8 pgs.

Yan, H., et al., "Diffusion Bending of Superplastic 7075 Aluminum Alloy," Materials Research Society Symposium Procedures, Jan. 1990, vol. 196, downloaded from http:/www.dx.dol.org/10.1557/Proc-196-149, pp. 149-154.

Zhang, J., et al., "An investigation on diffusion bonding of aluminum and magnesium using Ni interlayer," Materials Letters, Jun. 9, 2012, vol. 83,Elsevier, Amsterdam, The Netherlands, pp. 189-191.

Sunwoo, A., "Diffusion Bonding of Aluminum Ally, 8090" Scripta Metallurgica et Materialia, 1994, vol. 31, No. 4, Elsevier Science, Ltd., Amsterdam, The Netherlands, pp. 407-402.

* cited by examiner

DIFFUSION-BONDED METALLIC MATERIALS

CROSS-REFERENCE TO RELATED APPLICATIONS

The present application claims priority to and is a continuation-in-part of U.S. patent application Ser. No. 15/043,231 entitled "DIFFUSION-BONDED METALLIC MATERIALS," filed Feb. 12, 2016, the contents of which are incorporated herein by reference in their entirety.

FIELD OF THE DISCLOSURE

The present disclosure is generally related to diffusion-bonded metallic materials.

BACKGROUND

Diffusion bonding is a technique which involves pressing together components under heat to induce atomic diffusion and produce a metal bond. Some metallic materials (e.g., aluminum alloys) have a tenacious surface oxide that forms rapidly at low partial pressures of oxygen. Such surface oxide layers may be difficult to remove (e.g., via chemical and/or mechanical means). The rapid formation of surface oxide layers may make diffusion bonding of such metallic materials impractical.

SUMMARY

In a particular embodiment, a method includes disposing a hydride of a transition metal on a first metallic material, where at least one of the first metallic material or a second metallic material includes a surface oxide layer. The method includes, after disposing the hydride of the transition metal on the first metallic material, performing a diffusion bonding operation to bond the first metallic material to the second metallic material. During the diffusion bonding operation, the hydride of the transition metal chemically reacts with the surface oxide layer.

In another particular embodiment, a diffusion-bonded metallic material is disclosed. The diffusion-bonded metallic material is formed by a process that includes disposing a hydride of a transition metal on a first metallic material, where at least one of the first metallic material or a second metallic material includes a surface oxide layer. The method includes, after disposing the hydride of the transition metal on the first metallic material, performing a diffusion bonding operation to bond the first metallic material to the second metallic material. During the diffusion bonding operation, the hydride of the transition metal chemically reacts with the surface oxide layer.

In another particular embodiment, a diffusion-bonded metallic material is disclosed. The diffusion-bonded metallic material includes two metallic materials, a diffusion bond region disposed between the two metallic materials, and an oxidized region disposed between the two metallic materials. The diffusion bond region including a reaction byproduct of a hydride of a transition metal and a metal surface oxide layer and diffused metal atoms from the two metallic materials. The oxidized region includes metallic oxides of at least one of the two metallic materials, and the oxidized region does not include an oxide of the transition metal.

The features, functions, and advantages that have been described can be achieved independently in various embodiments or may be combined in other embodiments, further details of which are disclosed with reference to the following description and drawings.

DETAILED DESCRIPTION

The present disclosure describes diffusion-bonded metallic materials and processes of forming diffusion-bonded (DB) metallic materials. The present disclosure further describes diffusion-bonded/superplastically-formed (DB/SPF) metallic materials and processes of forming DB/SPF metallic materials.

In the present disclosure, a hydride of a transition metal is used to substantially break down a surface oxide layer on a surface of a metallic material in order to enable migration of metallic atoms during a diffusion bonding operation. Metallic materials, such as aluminum (Al), beryllium (Be), or magnesium (Mg) materials (among other materials, such as nickel-based materials, chromium-based materials, stainless steel materials, etc.), may be susceptible to formation of surface oxide layers that may prevent diffusion of metallic atoms between two metallic materials to be bonded. In a particular implementation, the hydride of the transition metal includes particles (e.g., a powder) or nanoparticles of a transition metal hydride.

Chemical reaction of the hydride of the transition metal with the surface oxide layers (e.g., Al, Be, or Mg oxide layers) enables migration of metal atoms (e.g., Al, Be, or Mg atoms) during the diffusion bonding operation. To illustrate, in the case of two aluminum materials (e.g., two aluminum or aluminum alloy sheets), the hydride of the transition metal reacts with aluminum oxide layers formed on the surfaces of the aluminum materials to form an oxide of the transition metal and aluminum metal, enabling diffusion bonding in locations where the hydride of the transition metal was applied. While the present disclosure describes the application of hydrides of the transition metals, alternative materials that are able to chemically react with a passivation oxide layer in order to allow diffusion of metallic atoms may be utilized.

In some cases, the hydride of the transition metal (or a metallic powder, such as an aluminum powder or an aluminum alloy powder, that includes hydride of the transition metal) is selectively applied (e.g., cold sprayed, plasma sprayed, coated, or otherwise applied) to particular areas of the metallic materials to be bonded. Selective application of the hydride of the transition metal may enable the formation of diffusion-bonded region(s) in areas where the hydride of the transition metal is applied. Areas where the hydride of the transition metal is not applied may represent oxidized region(s) that, in some cases, may be shaped via a superplastic forming operation (e.g., to form a superplastic corrugation), resulting in a diffusion-bonded/superplastically-formed (DB/SPF) metallic material.

Figure 1:
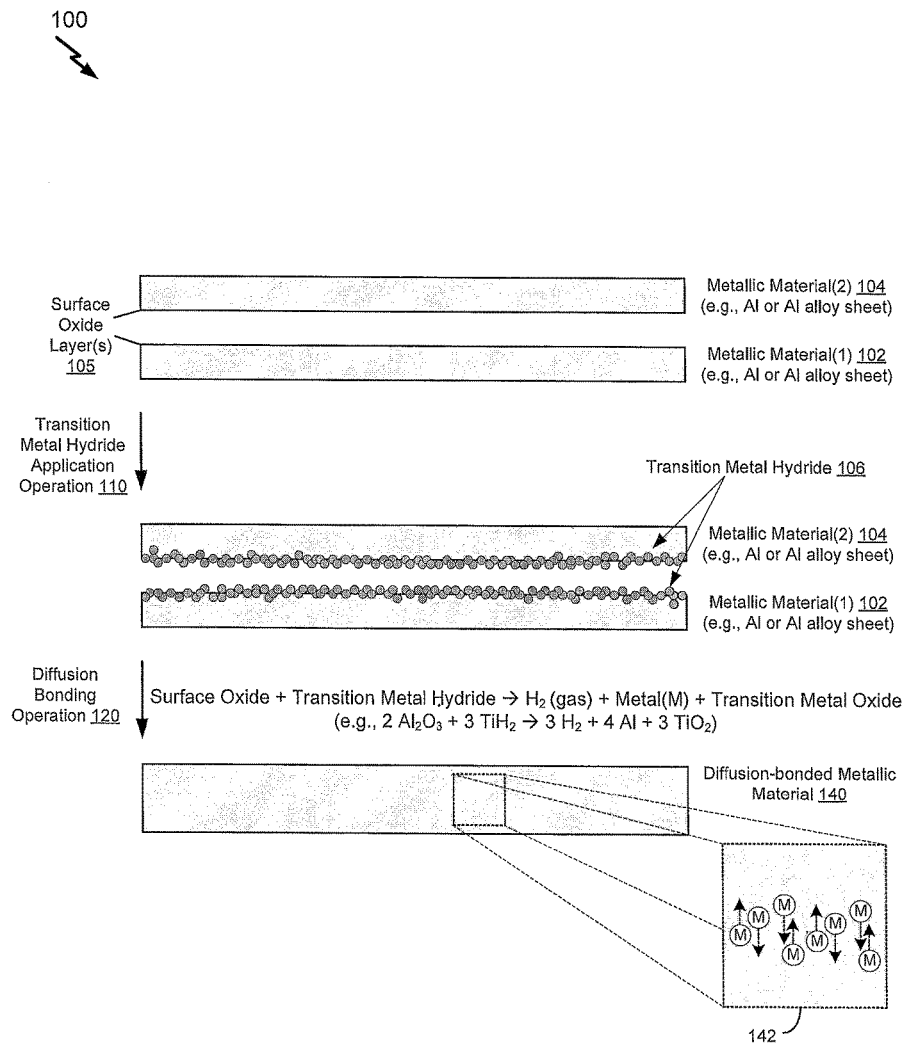
FIG. 1 is a diagram illustrating a process of forming a diffusion-bonded metallic material, according to one embodiment.

Referring to FIG. 1, a diagram 100 illustrates a particular embodiment of a process of forming a diffusion-bonded metallic material 140. In FIG. 1, a first metallic material 102 (identified as "Metallic Material(1)" in FIG. 1) is bonded to a second metallic material 104 (identified as "Metallic Material(2)" in FIG. 1) using a transition metal hydride 106 applied to a surface of the first metallic material 102, to a surface of the second metallic material 104, or a combination thereof. The transition metal hydride 106 chemically reacts with surface oxide layer(s) 105 on one or both of the metallic materials 102, 104 to break down the surface oxide layer(s) 105 in order to enable diffusion of metal atoms between the metallic materials 102, 104. The transition metal hydride 106 may include any transition metal. For some applications, hydrides of Scandium (Sc), Yttrium (Y), Titanium (Ti), Vanadium (V), Niobium (Nb), Tantalum (Ta), Chromium (Cr), Molybdenum (Mo), Tungsten (W), Manganese (Mn), Iron (Fe), Ruthenium (Ru), Cobalt (Co), Rhodium (Rh), Nickel (Ni), Palladium (Pd), Copper (Cu), Silver (Ag), may be preferred. For example, hydrides of some other transition metals tend to be unstable (e.g., HgH) or not a solid at room temperature (e.g., HgH2), which may make working with the hydrides of these transition metals more difficult. As another example, Zinc (Zn), Cadmium (Cd), and Mercury (Hg) are relatively volatile in their metallic and/or oxide states, which may make use of Zn, Cd, and Hg interfere with bonding. Further, although the FIG. 1 illustrates only one transition metal hydride 106, in some implementations, a mixture of transition metal hydrides are used.

FIG. 1 illustrates an example in which the transition metal hydride 106 is coated onto both surfaces of the metallic materials 102, 104. In other cases, as illustrated and further described herein with respect to FIG. 2, the transition metal hydride 106 is selectively applied to particular area(s) of the metallic material(s) 102, 104 (e.g., to form a DB/SPF metallic material). The transition metal hydride 106 may have different physical characteristics in different implementations. For example, in some implementations, nanoparticles of the transition metal hydride are used. In another example, a powder that includes the transition metal hydride 106 may be used where the powder has a characteristic dimension (e.g., an average diameter) larger than nanoscale. To illustrate, as used herein, the term "nanoparticle" refers to particles having a characteristic dimension (e.g., an average diameter) in a range of 1 nm to 100 nm. Thus, in some implementations, particles of the transition metal hydride 106 having a characteristic dimension larger than 100 nm are used. As another example, the transition metal hydride 106 may be mixed with or coated onto another material, such as a metallic material similar to one of the metallic materials 102, 104.

FIG. 1 illustrates an example of a transition metal hydride application operation 110 in which the transition metal hydride 106 is disposed on the first metallic material 102, the second metallic material 104, or a combination thereof. In the example of FIG. 1, the transition metal hydride 106 is coated or applied on surfaces of both the first metallic material 102 and the second metallic material 104. In other cases, the transition metal hydride 106 is selectively applied to a single one of the metallic materials 102, 104. In either case, FIG. 1 illustrates that the transition metal hydride application operation 110 results in the transition metal hydride 106 being disposed between the two metallic materials 102, 104. In a particular embodiment, the metallic materials 102, 104 include aluminum or aluminum alloy sheets (or materials that include different metals, such as an aluminum-containing material and an iron-containing material, such as steel), and the transition metal hydride application operation 110 includes disposing an aluminum alloy powder that includes the transition metal hydride 106 on the first metallic material 102 (and optionally the second metallic material 104). For example, the transition metal hydride may be formed as a coating on or mixed with the aluminum or aluminum alloy powder.

A diffusion bonding operation 120 may be performed after the transition metal hydride application operation 110. The diffusion bonding operation 120 may include the application of heat in an inert atmosphere (e.g., an argon atmosphere). In some cases, the diffusion bonding operation 120 may be performed at a pressure that is less than an ambient pressure. At least one of the first metallic material 102 or the second metallic material 104 includes the surface oxide layer 105, and chemical reaction of the transition metal hydride 106 with the surface oxide layer(s) 105 breaks down at least portions of the surface oxide layer(s) 105, enabling migration of metal atoms during the diffusion bonding operation 120. As described further herein, in some cases, the metallic materials 102, 104 may include aluminum (or an aluminum alloy), beryllium (or a beryllium alloy), or magnesium (or a magnesium alloy), among other alternatives. In some cases, the metallic materials 102, 104 may have different metallic compositions. As an illustrative, non-limiting example, one of the metallic materials 102, 104 may be an aluminum-containing material and one of the metallic materials 102, 104 may be an iron-containing material, such as steel. Other examples may include an aluminum-containing material and a magnesium-containing material or a nickel-containing material and an iron-containing material (e.g., steel), among other alternatives. As illustrated in FIG. 1, the diffusion bonding operation 120 results in the formation of the diffusion-bonded metallic material 140 in which the first metallic material 102 is bonded to the second metallic material 104.

FIG. 1 depicts a non-limiting illustrative example in which at least one of the metallic materials 102, 104 includes aluminum (or an aluminum alloy), and the surface oxide layer(s) 105 include an aluminum oxide layer. In this example, a chemical reaction of the transition metal hydride 106 ($TiH_2$ in the example) with the surface oxide layer(s) 105 breaks down at least a portion of the aluminum oxide layer(s), enabling migration of aluminum atoms during the diffusion bonding operation 120. As another example, at least one of the metallic materials 102, 104 may include beryllium (or a beryllium alloy), and the surface oxide layer(s) 105 include a beryllium oxide layer. In this example, a chemical reaction of the transition metal hydride 106 with the surface oxide layer(s) 105 breaks down at least a portion of the beryllium oxide layer(s), enabling migration of beryllium atoms during the diffusion bonding operation 120. As a further example, at least one of the metallic materials 102, 104 may include magnesium (or a magnesium alloy), and the surface oxide layer(s) 105 include a magnesium oxide layer. In this example, a chemical reaction of the transition metal hydride 106 with the surface oxide layer(s) 105 breaks down at least a portion of the magnesium oxide layer(s), enabling migration of magnesium atoms during the diffusion bonding operation 120.

FIG. 1 includes a callout view 142 that shows a representative example of a portion of the diffusion-bonded metallic material 140 (that depicts the migration of the metal atoms during the diffusion bonding operation 120). In the callout view 142, the metal atoms are identified by the letter M, with M representing Al, Be, or Mg (depending on the composition of the metallic materials 102, 104). The diffusion-bonded metallic material 140 may have a diffusion bond region with a thickness in a range of 1 nm to 100 nm. While not shown in the callout view 142 of FIG. 1, the diffusion bond region may include an oxide of the transition metal (e.g., $TiO_2$ in the example of FIG. 1) and the diffused metal atoms (e.g., Al, Be, or Mg atoms). Thus, while the callout view of FIG. 1 depicts the diffusion of the metal (M) atoms, it will be appreciated that the diffusion bonded metallic material 140 also includes an oxide byproduct of the chemical reaction of the transition metal hydride 106 and the metallic surface oxides (with the $H_2$ byproduct off-gassed during the diffusion bonding operation 120).

In some cases, after disposing the transition metal hydride 106 on the first metallic material 102 (or both the metallic materials 102, 104), one or more additional operations may be performed to enhance bonding between the two metallic materials 102, 104. The additional operation(s) may apply energy to at least a portion of the first metallic material 102 and a portion of the second metallic material 104 to increase atomic mobility. Illustrative examples of energy application may include using at least one ultrasonic waveform source, using at least one laser light source, peening at least one of the first metallic material 102 or the second metallic material 104, or using cavitation of a fluid (among other alternatives). In some cases, the energy may be applied during or after the diffusion bonding operation 120.

Thus, FIG. 1 illustrates an example of a process of forming a diffusion-bonded metallic material. In FIG. 1, a transition metal hydride disposed between two metallic materials (e.g., Al, Be, or Mg sheets) chemically reacts with surface oxide layer(s) to break down the surface oxide layer(s) in order to enable diffusion of metal atoms between the metallic materials. In some cases, the diffusion-bonded metallic material formed according to the process depicted in FIG. 1 may be used as a component of a vehicle (e.g., a space vehicle, a water vehicle, an underwater vehicle, an air vehicle, or a ground vehicle), among other alternatives.

Figure 2:
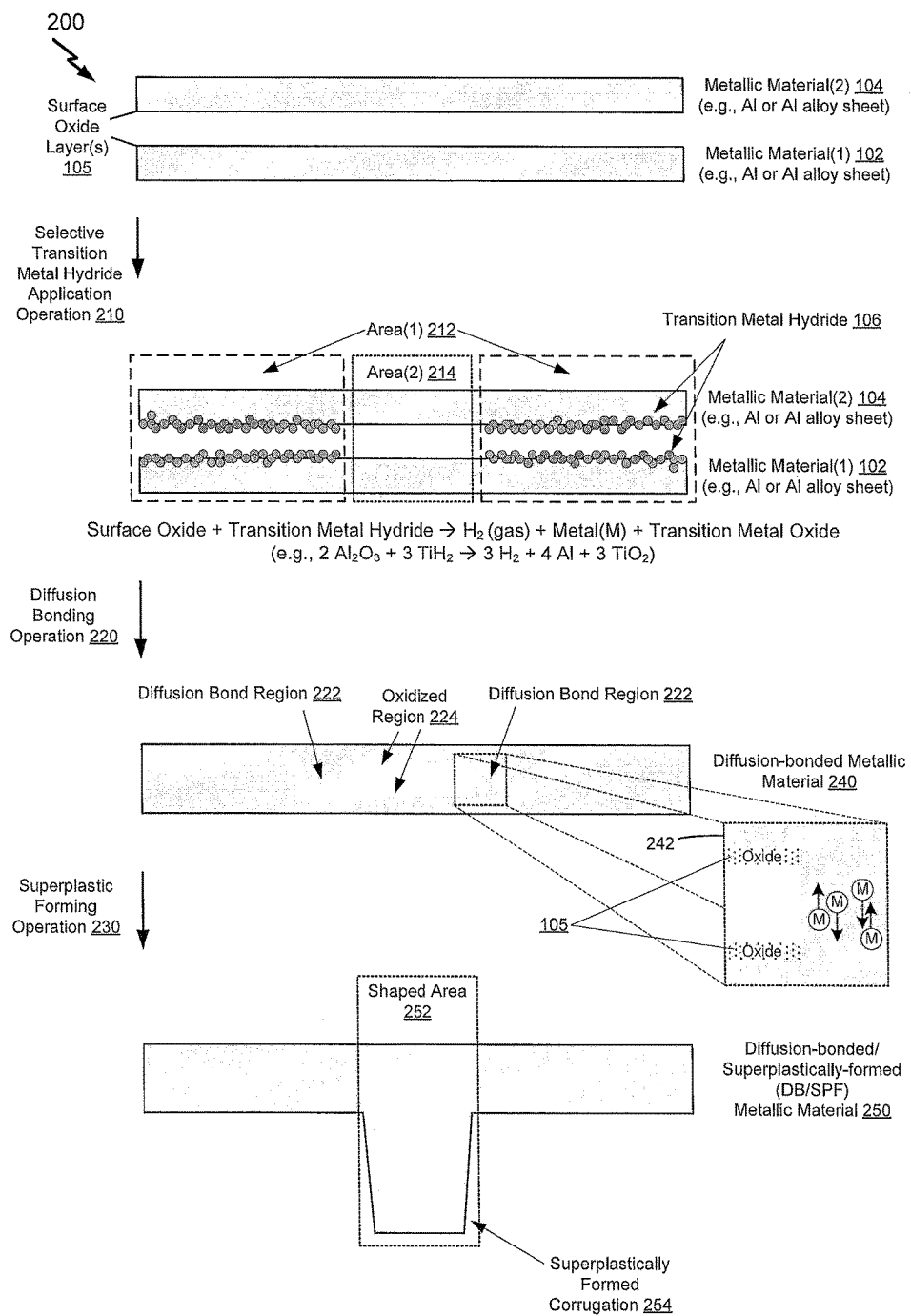
FIG. 2 is a diagram illustrating a process of forming a diffusion-bonded/superplastically-formed (DB/SPF) metallic material, according to one embodiment.

Referring to FIG. 2, a diagram 200 illustrates a particular embodiment of a process of forming a diffusion-bonded/superplastically-formed (DB/SPF) metallic material 250. FIG. 2 illustrates that the transition metal hydride 106 may be selectively applied to particular area(s) of the metallic material(s) 102, 104. The transition metal hydride 106 chemically reacts with surface oxide layer(s) 105 on one or both of the metallic materials 102, 104 in order to enable diffusion of metal atoms between the metallic materials 102, 104. FIG. 2 further illustrates that area(s) where the transition metal hydride 106 is not applied may be shaped via a superplastic forming operation.

FIG. 2 illustrates an example of a selective transition metal hydride application operation 210 in which the transition metal hydride 106 is applied to a first area 212 between the two metallic materials 102, 104. In the example of FIG. 2, the transition metal hydride 106 is coated or applied on surfaces of both the first metallic material 102 and the second metallic material 104. In other cases, the transition metal hydride 106 is selectively applied to a single one of the metallic materials 102, 104. In either case, FIG. 2 illustrates that the selective transition metal hydride application operation 210 results in the transition metal hydride 106 being disposed in the first area 212 between the two metallic materials 102, 104. In a particular embodiment, the metallic materials 102, 104 include aluminum or aluminum alloy sheets, and the selective transition metal hydride application operation 210 includes disposing an aluminum alloy powder that includes the transition metal hydride 106 on the first metallic material 102 (and optionally the second metallic material 104). In the example of FIG. 2, the transition metal hydride 106 is not applied to a second area 214 between the two metallic materials 102, 104 as part of the selective transition metal hydride application operation 210.

A diffusion bonding operation 220 may be performed after the selective transition metal hydride application operation 210. At least one of the first metallic material 102 or the second metallic material 104 includes the surface oxide layer 105, and chemical reaction of the transition metal hydride 106 with the surface oxide layer(s) 105 breaks down at least portions of the surface oxide layer(s) 105, enabling migration of metal atoms during the diffusion bonding operation 220. As described further herein, in some cases, the metallic materials 102, 104 may include aluminum (or an aluminum alloy), beryllium (or a beryllium alloy), or magnesium (or a magnesium alloy), among other alternatives. In some cases, the metallic materials 102, 104 may include different metals. As an illustrative, non-limiting example, one of the metallic materials 102, 104 may be an aluminum-containing material and one of the metallic materials 102, 104 may be an iron-containing material, such as steel (among other alternatives). As illustrated in FIG. 2, the diffusion bonding operation 220 results in formation of a diffusion-bonded metallic material 240, having diffusion bond region(s) 222 corresponding to the first area 212 and oxidized region(s) 224 corresponding to the second area 214.

The diffusion bond region(s) 222 include an oxide of the transition metal and diffused metal atoms from the two metallic materials 102, 104. The oxidized region(s) 224 include metallic oxides of the two metallic materials 102, 104. Because the transition metal hydride 106 is not applied to the second area 214 during the selective transition metal hydride application operation 210, the oxidized region(s) 224 do not include oxides of the transition metal. The diffusion bond region(s) 222 may have a thickness in a range of 1 nm to 100 nm.

FIG. 2 depicts a non-limiting illustrative example in which at least one of the metallic materials 102, 104 includes aluminum (or an aluminum alloy), and the surface oxide layer(s) 105 include an aluminum oxide layer. In this example, a chemical reaction of the transition metal hydride 106 ($TiH_2$ in the illustrated example) with the surface oxide layer(s) 105 breaks down at least a portion of the aluminum oxide layer(s), enabling migration of aluminum atoms during the diffusion bonding operation 220. As another example, at least one of the metallic materials 102, 104 may include beryllium (or a beryllium alloy), and the surface oxide layer(s) 105 include a beryllium oxide layer. In this example, a chemical reaction of the transition metal hydride 106 with the surface oxide layer(s) 105 breaks down at least a portion of the beryllium oxide layer(s), enabling migration of beryllium atoms during the diffusion bonding operation 220. As a further example, at least one of the metallic materials 102, 104 may include magnesium (or a magnesium alloy), and the surface oxide layer(s) 105 include a magnesium oxide layer. In this example, a chemical reaction of the transition metal hydride 106 with the surface oxide layer(s) 105 breaks down at least a portion of the magnesium oxide layer(s), enabling migration of magnesium atoms during the diffusion bonding operation 220.

FIG. 2 includes a callout view 242 that shows a representative example of a portion of the diffusion-bonded metallic material 240 (that depicts the migration of the metal atoms during the diffusion bonding operation 220). In the callout view 242, the metal atoms are identified by the letter M, with M representing Al, Be, or Mg (depending on the composition of the metallic materials 102, 104). While not shown in the callout view 242 of FIG. 2, the diffusion bond region(s) 222 may also include an oxide byproduct (e.g., $TiO_2$ in the illustrated example) of reaction of the transition metal hydride 106. Thus, while the callout view 242 of FIG. 2 depicts the diffusion of the metal (M) atoms, it will be appreciated that the diffusion bonded metallic material 240 also includes the transition metal oxide byproduct of the chemical reaction of the transition metal hydride 106 and the metallic surface oxides. The $H_2$ byproduct may be off-gassed during the diffusion bonding operation 220.

In some cases, after disposing the transition metal hydride 106 on the first metallic material 102 (or both the metallic materials 102, 104), one or more additional operations may be performed to enhance bonding between the two metallic materials 102, 104. The additional operation(s) may include applying energy to at least a portion of the first metallic material 102 and a portion of the second metallic material 104 to increase atomic mobility. Illustrative examples of energy application may include using at least one ultrasonic waveform source, using at least one laser light source, peening at least one of the first metallic material or the second metallic material, or using cavitation of a fluid (among other alternatives). In some cases, the energy may be applied during or after the diffusion bonding operation 220.

In the particular embodiment illustrated in FIG. 2, the process further includes performing a superplastic forming operation 230. The superplastic forming operation 230 is used to shape the second area 214 of the first metallic material 102 after the diffusion bonding operation 220. The second area 214 corresponds to the oxidized region 224 where the transition metal hydride 106 was not applied to the first metallic material 102 during the selective transition metal hydride application operation 210. FIG. 2 illustrates that the superplastic forming operation 230 may result in formation of a shaped area 252 that includes a superplastically formed corrugation 254 (where the oxidized region 224 depicted in the diffusion-bonded metallic material 240 corresponds to the superplastically formed corrugation 254 depicted in the DB/SPF metallic material 250).

Thus, FIG. 2 illustrates an example of a process of forming a diffusion-bonded/superplastically-formed (DB/SPF) metallic material. In FIG. 2, a transition metal hydride (or a mixture of materials including at least one transition metal hydride) is selectively applied to surface(s) of two metallic materials (e.g., Al, Be, or Mg sheets) chemically react with surface oxide layer(s) in order to enable diffusion of metal atoms between the metallic materials. FIG. 2 illustrates that region(s) where the transition metal hydride is not applied may be shaped to form superplastically-formed feature(s). In some cases, the DB/SPF metallic material formed according to the process depicted in FIG. 2 may be used as a component of a vehicle (e.g., a space vehicle, a water vehicle, an underwater vehicle, an air vehicle, or a ground vehicle), among other alternatives.

Figure 3:
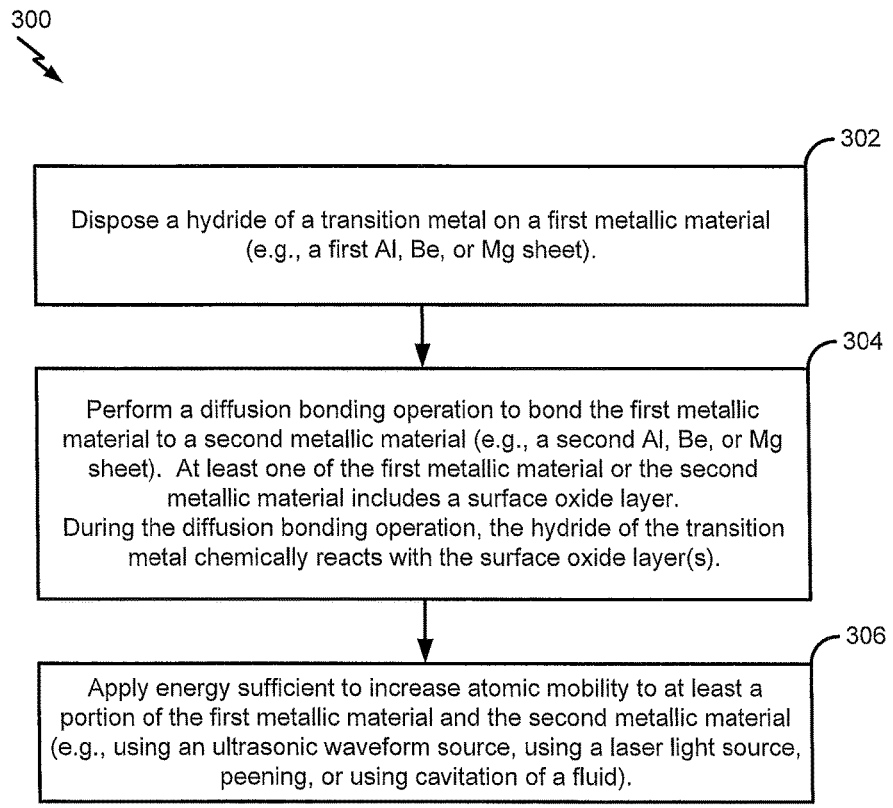
FIG. 3 is a flow chart illustrating a particular embodiment of a method of a process of forming a diffusion-bonded metallic material.

Referring to FIG. 3, a flow diagram illustrates a particular embodiment of a process 300 of forming a diffusion-bonded metallic material. In some cases, the process 300 of FIG. 3 may be used to form the diffusion-bonded metallic material 140 of FIG. 1. FIG. 3 illustrates that, in some cases, energy may be applied during or after a diffusion bonding operation to increase atomic mobility of atoms of metallic material(s), in order to further enhance bond strength at diffusion-bonded location(s).

The process 300 includes disposing a transition metal hydride on a first metallic material, at 302. For example, referring to FIG. 1, the transition metal hydride application operation 110 includes disposing the transition metal hydride 106 on the first metallic material 102 (e.g., cold spraying the transition metal hydride 106 onto the first metallic material 102). In the particular embodiment illustrated in FIG. 1, the transition metal hydride application operation 110 also includes disposing the transition metal hydride 106 on the second metallic material 104 (e.g., cold spraying the transition metal hydride 106 onto the second metallic material 104).

The process 300 includes performing a diffusion bonding operation to bond the first metallic material to a second metallic material, at 304. For example, referring to FIG. 1, the diffusion bonding operation 120 may be performed to bond the first metallic material 102 to the second metallic material 104. As depicted in the callout view 142 of FIG. 1, a chemical reaction of the transition metal hydride 106 with the surface oxide layer(s) 105 (e.g., an aluminum oxide layer, a beryllium oxide layer, or a magnesium oxide layer) of one or more of the metallic materials 102, 104 substantially breaks down the surface oxide layer(s) 105, enabling migration of metal (M) atoms during the diffusion bonding operation 120.

In the particular embodiment illustrated in FIG. 3, the process 300 also includes applying energy sufficient to increase atomic mobility to at least a portion of the first metallic material and a portion of the second metallic material, at 306. For example, referring to FIG. 1, after disposing the transition metal hydride 106 on the first metallic material 102 (or both of the metallic materials 102, 104), one or more additional operations may be performed to enhance bonding between the two metallic materials 102, 104. The additional operation(s) may include applying energy sufficient to increase atomic mobility to at least a portion of the first metallic material 102 and a portion of the second metallic material 104. Illustrative examples of energy application may include applying ultrasonic waves using at least one ultrasonic waveform source, applying laser light using at least one laser light source, peening at least one of the first metallic material or the second metallic material, or using cavitation of a fluid (among other alternatives). In some cases, the energy may be applied during or after the diffusion bonding operation 120.

Thus, FIG. 3 illustrates an example of a process of forming a diffusion-bonded metallic material. In the example of FIG. 3, a transition metal hydride disposed between two metallic materials (e.g., Al, Be, or Mg sheets) chemically reacts with surface oxide layer(s) to break down at least a portion of the surface oxide layer(s) in order to enable diffusion of metal atoms between the metallic materials.

Figure 4:
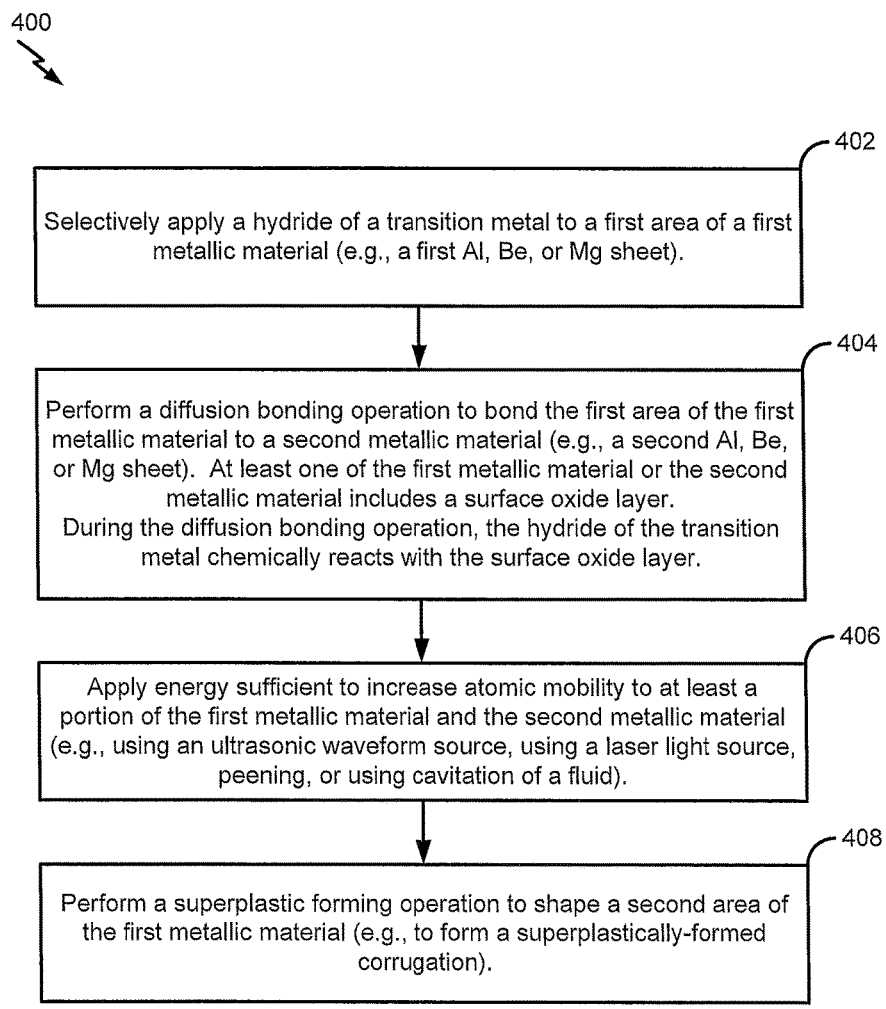
FIG. 4 is a flow chart illustrating a particular embodiment of a method of a process of forming a DB/SPF metallic material.

Referring to FIG. 4, a flow diagram illustrates a particular embodiment of a process 400 of forming a diffusion-bonded/superplastically-formed (DB/SPF) metallic material. In some cases, the process 400 of FIG. 4 may be used to form the DB/SPF metallic material 250 of FIG. 2.

The process 400 includes selectively applying a transition metal hydride to a first area of a first metallic material, at 402. For example, referring to FIG. 2, the selective transition metal hydride application operation 210 includes disposing the transition metal hydride 106 on the first area 212 of the first metallic material 102 (e.g., cold spraying the transition metal hydride 106 onto the first area 212 of the first metallic material 102). In the particular embodiment illustrated in FIG. 2, the selective transition metal hydride application operation 210 also includes disposing the transition metal hydride 106 on the first area 212 of the second metallic material 104 (e.g., cold spraying the transition metal hydride 106 onto the first area 212 of the second metallic material 104).

The process 400 includes performing a diffusion bonding operation to bond the first area of the first metallic material to a second metallic material, at 404. For example, referring to FIG. 2, the diffusion bonding operation 220 may be performed to bond the first area 212 of the first metallic material 102 to the second metallic material 104. As depicted in the callout view 242 of FIG. 2, a chemical reaction of the transition metal hydride 106 with the surface oxide layer(s) 105 (e.g., an aluminum oxide layer, a beryllium oxide layer, or a magnesium oxide layer) of one or more of the metallic materials 102, 104 breaks down at least a portion of the surface oxide layer(s) 105, enabling migration of metal (M) atoms during the diffusion bonding operation 220.

In the particular embodiment illustrated in FIG. 4, the process 400 also includes applying energy sufficient to increase atomic mobility to at least a portion of the first metallic material and a portion of the second metallic material, at 406. For example, referring to FIG. 2, after disposing the transition metal hydride 106 on the first metallic material 102 (or both of the metallic materials 102, 104), one or more additional operations may be performed to enhance bonding between the two metallic materials 102, 104. The additional operation(s) may include applying energy sufficient to increase atomic mobility to at least a portion of the first metallic material 102 and a portion of the second metallic material 104. Illustrative examples of energy application may include using at least one ultrasonic waveform source, using at least one laser light source, peening at least one of the first metallic material or the second metallic material, or using cavitation of a fluid (among other alternatives). In some cases, the energy may be applied during or after the diffusion bonding operation 220.

In the particular embodiment illustrated in FIG. 4, the process 400 further includes performing a superplastic forming operation to shape an area of the first metallic material, at 408. For example, referring to FIG. 2, the superplastic forming operation 230 may be performed to shape the second area 214 (where the transition metal hydride 106 was not applied during the selective transition metal hydride application operation 210) to form the shaped area 252. As shown in the example of FIG. 2, the shaped area 252 may include the superplastically formed corrugation 254.

Thus, FIG. 4 illustrates an example of a process of forming a DB/SPF metallic material. In the example of FIG. 4, a transition metal hydride (or a mixture of materials including a transition metal hydride) selectively applied to a first area disposed between two metallic materials (e.g., Al, Be, or Mg sheets) chemically reacts with surface oxide layer(s) in order to enable diffusion of metal atoms in the first area between the metallic materials. In a second area where the transition metal hydride is not applied, a superplastic forming operation may be performed to shape the second area (e.g., to form a superplastically-formed corrugation).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A diffusion-bonded metallic material formed by a method comprising:
    disposing a hydride of a transition metal on a first metallic material, wherein at least one of the first metallic material or a second metallic material includes a surface oxide layer; and
    after disposing the hydride of the transition metal on the first metallic material, performing a diffusion bonding operation to bond the first metallic material to the second metallic material forming a diffusion bond region, wherein, during the diffusion bonding operation, the hydride of the transition metal chemically reacts with the surface oxide layer,
    wherein the diffusion-bonded metallic material comprises an oxidized region corresponding to the surface oxide layer and disposed between the first metallic material and the second metallic material, wherein the oxidized region includes metallic oxides of at least one of the first metallic material or the second metallic material, and wherein the oxidized region does not include an oxide of the transition metal.

2. A diffusion-bonded metallic material comprising an oxidized region corresponding to a surface oxide layer and disposed between a first metallic material and a second metallic material, wherein the oxidized region includes metallic oxides of at least one of the first metallic material or the second metallic material, and wherein the oxidized region does not include an oxide of a transition metal.

3. A diffusion-bonded metallic material, comprising:
    two metallic materials;
    a diffusion bond region disposed between the two metallic materials, the diffusion bond region including a reaction byproduct of a hydride of a transition metal and a metal surface oxide layer and diffused metal atoms from the two metallic materials; and an oxidized region corresponding to the metal surface oxide layer and disposed between the two metallic materials, wherein the oxidized region includes metallic oxides of at least one of the two metallic materials, wherein the oxidized region corresponds to a superplastically formed corrugation, and wherein the oxidized region does not include an oxide of the transition metal.

4. The diffusion-bonded metallic material of claim 3, wherein at least one of the two metallic material includes aluminum, beryllium, or magnesium, wherein the metal surface oxide layer includes an aluminum oxide layer, a beryllium oxide layer, or a magnesium oxide layer.

5. The diffusion-bonded metallic material of claim 3, wherein the two metallic materials have different metallic compositions.

6. The diffusion-bonded metallic material of claim 3, wherein the diffusion bond region has a thickness in range of 1 nm to 100 nm.

7. A vehicle comprising the diffusion-bonded metallic material of claim 3.

8. The vehicle of claim 7, wherein the vehicle includes a space vehicle, a water vehicle, an underwater vehicle, an air vehicle, or a ground vehicle.

9. The diffusion-bonded metallic material of claim 1, wherein the oxidized region corresponds to a superplastically formed corrugation.

10. The diffusion-bonded metallic material of claim 1, wherein the oxidized region comprises a shaped region.

11. The diffusion-bonded metallic material of claim 1, wherein at least one of the first metallic material or the second metallic material includes aluminum, beryllium, or magnesium, and wherein the surface oxide layer includes an aluminum oxide layer, a beryllium oxide layer, or a magnesium oxide layer.

12. The diffusion-bonded metallic material of claim 2, wherein the oxidized region corresponds to a superplastically fondled corrugation.

13. The diffusion-bonded metallic material of claim 2, wherein at least one of the first metallic material or the second metallic material includes aluminum, beryllium, or magnesium, and wherein the surface oxide layer includes an aluminum oxide layer, a beryllium oxide layer, or a magnesium oxide layer.

14. The diffusion-bonded metallic material of claim 2, wherein the first metallic material and the second metallic material have different metallic compositions.

15. The diffusion-bonded metallic material of claim 2, further comprising a diffusion bond region disposed between the first metallic material and the second metallic material, wherein the diffusion bond region has a thickness in range of 1 nm to 100 nm.

16. A vehicle comprising the diffusion-bonded metallic material of claim 2.

17. The vehicle of claim 16, wherein the vehicle includes a space vehicle, a water vehicle, an underwater vehicle, an air vehicle, or a ground vehicle.

18. The diffusion-bonded metallic material of claim 2, wherein the oxidized region comprises a shaped region.

* * * * *